United States Patent [19]

Rypinski, Jr.

[11] 3,764,926

[45] Oct. 9, 1973

[54] METHOD AND APPARATUS FOR DEMODULATING A PHASE REVERSAL MODULATED ALTERNATING CURRENT WAVE

[75] Inventor: Chandos A. Rypinski, Jr., Tiburon, Calif.

[73] Assignee: Rydax, Incorporated, San Rafael, Calif.

[22] Filed: Dec. 2, 1971

[21] Appl. No.: 204,230

[52] U.S. Cl. .................. 329/104, 325/320, 329/110, 178/66 R

[51] Int. Cl. .............................................. H04l 27/22

[58] Field of Search ............................ 329/104, 110; 325/320, 30; 178/66 R, 67, 88

[56] References Cited

UNITED STATES PATENTS

| | | | |
|---|---|---|---|
| 3,112,448 | 11/1963 | McFarlane et al. | 325/320 X |
| 3,493,877 | 2/1970 | Jacobson | 329/104 X |
| 3,559,083 | 1/1971 | Crouse | 329/104 |
| 2,904,683 | 9/1959 | Meyer | 329/104 X |
| 3,020,485 | 2/1962 | Secretan | 329/104 |

*Primary Examiner*—Alfred L. Brody
*Attorney*—Robert H. Fraser et al.

[57] ABSTRACT

A method and apparatus is provided for deriving binary data from an alternating current wave modulated by phase reversals in which an amplitude limited wave is applied to a resonator which has a preselected frequency and Q such that the resonator provides a signal having amplitude fluctuations corresponding to the phase reversals of the applied alternating current wave. The signal from the resonator is rectified and applied to a threshold circuit which provides an output signal which identifies each phase reversal of the alternating current wave therby representing the binary data borne by the alternating current wave.

8 Claims, 7 Drawing Figures

METHOD AND APPARATUS FOR DEMODULATING A PHASE REVERSAL MODULATED ALTERNATING CURRENT WAVE

BACKGROUND OF THE INVENTION

1. Field of the Invention.

This invention relates to a method and apparatus for demodulating an alternating current wave bearing modulation in the form of phase reversals. More particularly, the invention relates to a demodulator for deriving binary coded data from an alternating current wave bearing phase reversal information representing one binary value without requiring comparison with a reference wave.

2. Description of the Prior Art.

One of the methods known in the prior art for the transmission of binary data is to employ an alternating current wave in which one phase represents one binary value of information and another phase represents another value. The simplest and most reliable transmission systems of this type employ a wave which is reversed, as, for example, from 0° to 180° to represent the binary data. In some systems a wave of reference phase represents one binary value while a wave of opposite phase represents the that binary value. In other systems the continuous transmission of the wave indicates one binary value while a reversal of phase indicates the other binary value. One example of the prior art which recognizes that binary data is best detected when the transmitted modulation is polar in nature may be found in U.S. Pat. No. 2,676,245, issued to M. L. Doelz on Apr. 20, 1954, wherein the polarity of the signal is keyed by phase reversals, and the detection of the reversals is accomplished by a comparison of the phase of the present and previous signals in time. One critical requirement of the aforementioned arrangement is that a knowledge of the instant of start and finish of each signaling period is required so taht switching operations may be performed. Another example of the prior art illustrates that the methods of transmission can be extended to phase shifts of 90° rather than 180° reversals as shown in U.S. Pat. No. 2,905,812, issued to M. L. Doelz on Mar. 28, 1961.

One of the main limitations of the systems for phase reversal transmission of information in the prior art is that they require phase locked oscillators from which clocking and gating signals are derived to accomplish a demodulation of the signal particularly in noisy communications mediums. This means that either a separate synchronizing signal must be transmitted over another transmission link or that a certain amount of the time of transmission in the signal channel must be allotted to the transmission of some sort of signal which will produce a synchronization of oscillators between the transmitter and the receiver in order to decode the modulated wave. Although some other prior art methods of detecting phase reversal modulation have been proposed which depend upon measurement of the time interval of zero crossings or wave shapes, these methods generally perform less effectively in noisy transmission conditions because the information is derived from voltage measurements rather than the summing of energy. These latter methods are less than satisfactory in a radio communication medium where there are impediments from noise, non-linear distortion and envelope delay.

SUMMARY OF THE INVENTION

This invention is related to the transmission of binary data by means of an alternating current wave bearing information in the form of phase reversals and the demodulation of the data where the transmission may have been through a noisy, low quality transmission link such as may be found in radio transmission systems. More particularly, the invention contemplates a method and apparatus for detecting phase reversal keyed alternating current waves without a need for synchronized reference waves or clock signals at either the frequency of the wave or at the rate of transmission of the information.

Briefly, the present invention provides a method and apparatus for deriving binary information from an alternating current wave which is modulated by reversals in phase to represent the information. The alternating current wave may be transmitted over a transmission link such as a radio transmitter and receiver as a subcarrier or pilot signal along with other signals. After having derived the alternating current wave from the transmitted information, the wave is applied to apparatus for limiting its amplitude to a predetermined value. The amplitude limited wave is then applied to a resonator having a resonant frequency corresponding to the alternating current wave and having a Q, i.e., efficiency which is chosen in relationship to the rate at which binary information is to be transmitted. By this means the resonator provides an output signal of varying amplitude whenever the applied amplitude limited alternating current wave reverses in phase. A full wave rectifier is connected to the resonator along with a low pass filter at its output to generate a signal which fluctuates in amplitude in accordance with phase reversals of the alternating current wave. A threshold circuit connected to the output of the low pass filter provides a binary output signal which shifts from one value to another in response to each phase reversal of the alternating current wave.

DETAILED DESCRIPTION OF THE DRAWINGS

A better understanding of the invention may be had from a reading of the following specification taken in conjunction with the drawings in which.

DETAILED DESCRIPTION

Figure 1:
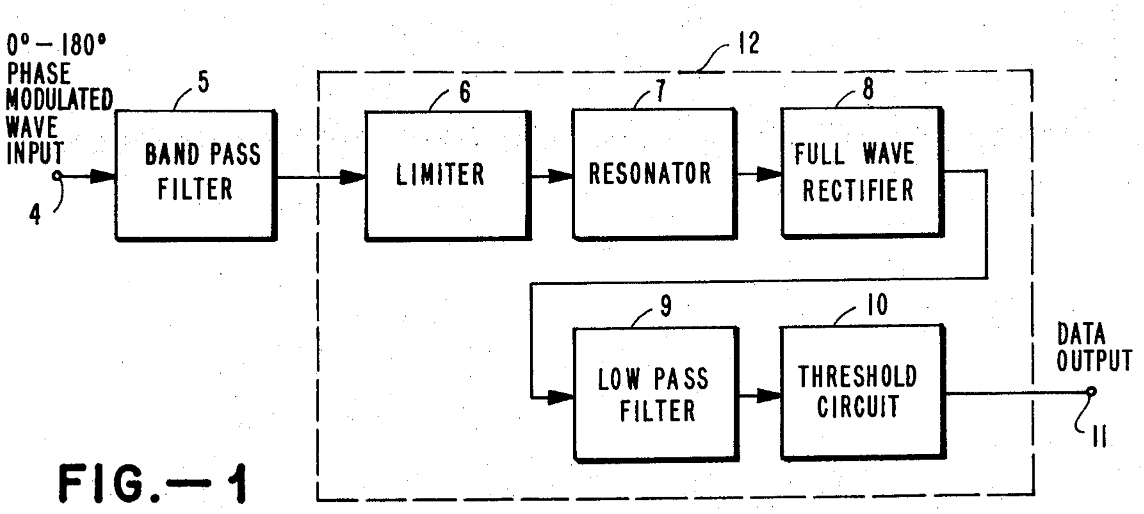
FIG. 1 is a block diagram illustrating one form of apparatus in accordance with the invention.

In the arrangement of FIG. 1 a phase reversal modulated alternating current wave which may be transmitted in a transmission link as a pilot signal or sub-carrier along with other data signals or voice signals applied to an input terminal 4. By means of a bandpass filter 5 having a center frequency corresponding to the frequency of the alternating current wave, the phase modulated alternating current wave is separated from other waves, signals which are not of interest. The signal from the bandpass filter 5 is applied to an amplitude limiter circuit 6 which functions to provide at its output an alternating current wave of a predetermined amplitude over a wide variation of the amplitude of the wave applied to the terminal 4. The amplitude limited wave from the limiter 6 is then applied to a resonator 7 whose resonant frequency corresponds to the alternating current wave. The output signal from the resonator 7 which varies in amplitude in accordance with phase reversals of the signal applied to the terminal 4 is then applied to a full wave rectifier 8 whose output is connected to a low pass filter 9. The output of the low pass filter 9 represents a signal which follows the peaks of the wave from the full wave rectifier 8 and hence the envelope of the wave derived from the resonator 7 so that the signal from the low pass filter 9 fluctuates in accordance with phase reversals of the wave applied to the terminal 4. By means of a threshold circuit 10 an output signal may be derived at the output terminal 11 which identifies each phase reversal of the wave applied to the terminal 4.

Figure 2:
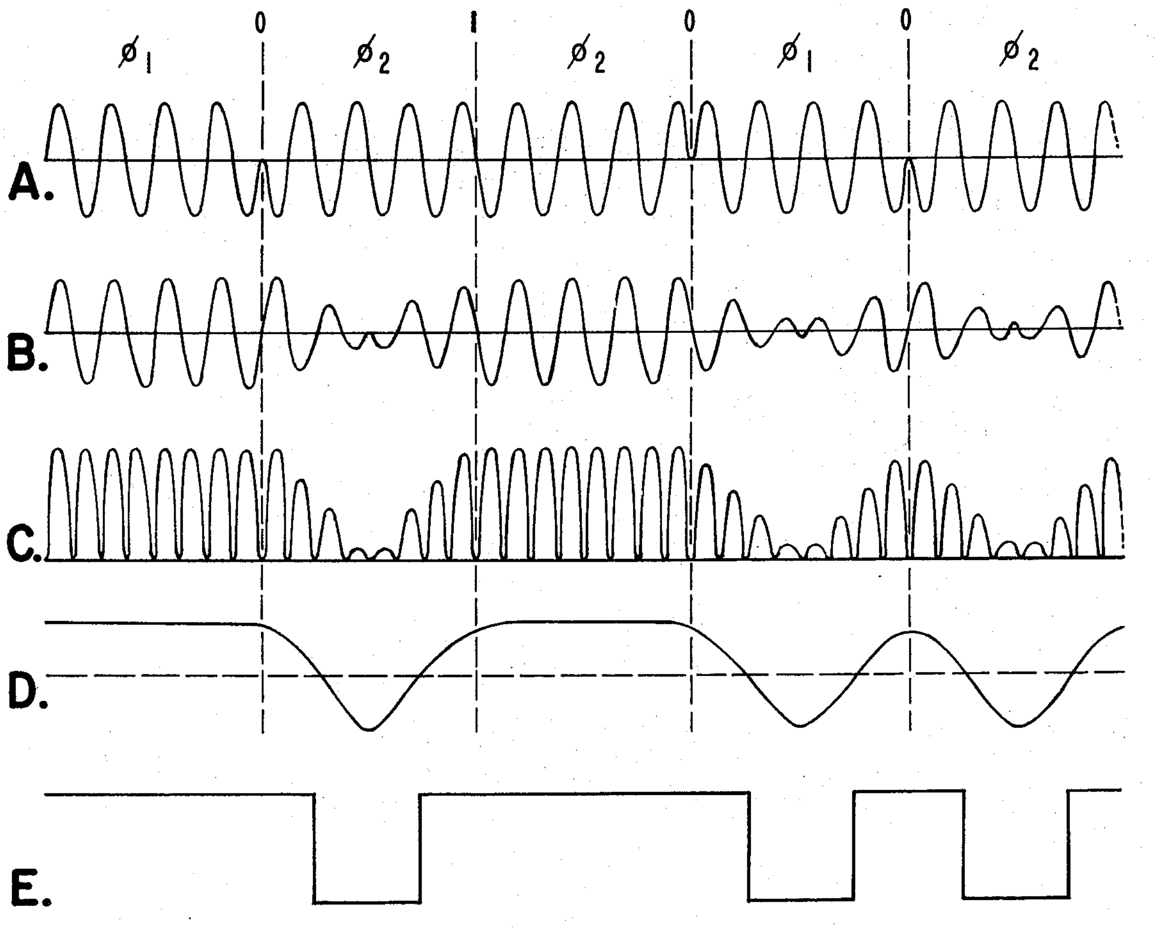
FIGS. 2A, 2B, 2C, 2D and 2E is a set of graphical illustrations setting forth various waveforms which appear in the apparatus of the invention; and, FIG. 3 is a schematic circuit diagram of the portion of the apparatus of FIG. 1 enclosed within dashed rectangle 12.

The operation of the arrangement of FIG. 1 may best be understood in conjunction with the graphical illustrations of FIG. 2 in which FIG. 2A illustrates a phase reversal modulated alternating current wave which may be considered to be of constant amplitude and hence corresponds to that appearing at the output of the limiter 6 of FIG. 1. As shown in FIG. 2A the signaling format may be such that the wave is transmitted at a given phase designated $\phi_1 = 0°$ phase, with phase reversals between phase $\phi_1$ and $\phi_2 = 180°$ phase. Data is transmitted by assigning four complete alternating current cycles to each period for the transmission of a single bit of binary data. Thus, for example, if the wave of FIG. 2A has a nominal frequency of 600 cycles per second and four cycles per second are assigned to the transmission of each bit the rate of transmission is equal to 150 bits per second (bps). As shown in FIG. 2A, the first four cycles of the wave at the left of the drawing are transmitted in the phase $\phi_1$ with a phase reversal appearing at the end of the given period to reverse the phase of the wave to $\phi_2$. In accordance with an assumed convention for the transmission of the binary information the reversal of phase at the end of the first four cycles and at the commencement of the succeeding four cycles is identified as a binary 0. Further, in accordance with the convention, the lack of a phase reversal indicates a binary 1. Thus, for the succeeding eight cycles of the phase $\phi_2$ of the wave of FIG. 2A no phase reversal takes place and therefore the transmission of a binary 1 is indicated. At the end of the third bit period another phase reversal takes place in the wave of FIG. 2A, thereby indicating another binary 0 and returning the transmitted wave to the phase $\phi_1$. For illustration purposes, another reversal in phase is shown at the end of the fourth bit period thereby indicating the transmission of binary 0 and a reversal from phase $\phi_1$ to phase $\phi_2$. Although all possibilities for the transmission of binary information have not been indicated in FIG. 2A, it will be understood that a continuous series of 1s would contemplate the transmission of a given phase of the wave continuously without phase reversals, while a continuous transmission of zeroes requires the reversal of the phase of the wave after each four cycles of transmission. Although a particular form of coding of the wave of FIG. 2A is shown and described by way of example it will be understood that the essence of the invention contemplates the identification of phase reversals of a wave and is not necessarily limited to the particular arbitrary assignment of binary values illustrated and described.

In accordance with the invention, the wave of FIG. 2A is applied to the resonator 7 of FIG. 1 which has a resonant frequency corresponding to the frequency of the wave of FIG. 2A as, for example, 600 cps in the example given. Furthermore, the Q, i.e., efficiency, of the resonator 7 is chosen so that it will produce an amplitude variation at its output corresponding to each phase reversal. The amplitude variation in question may be best seen in FIG. 2B in which during the first bit period the output of the resonator remains constant during the first bit period and decays substantially to zero during the second bit period due to the phase reversal corresponding to the first binary 0 transmitted. In operation, upon a reversal of phase the energy of the applied wave gradually decreases the stored energy of the resonator to a minimum value and then restores the energy in the resonator with oscillation occurring at the new phase $\phi_2$. As may be noted, the output signal of FIG. 2B of the resonator 7 of FIG. 1 continues at a constant value during the third bit period until a subsequent phase reversal is encountered whereupon the energy in the resonator is again diminished to a minimum value and rises as a result of the applied wave with reversed phase. The appearance of the next successive phase reversal again causes the energy in the resonator 7 to decay and to increase as before.

The output signal from the resonator 7 of FIG. 1 and as shown in FIG. 2B is applied to the full wave rectifier 8 which supplies an output signal corresponding to FIG. 2C. The rectified signal of FIG. 2C is then applied to the low pass filter 9 of FIG. 1 resulting in the signal of FIG. 2D which follows the envelope of the output of the resonator 7 thereby having an amplitude variation corresponding to the phase reversals of the wave applied to the input terminal 4 of FIG. 1. By applying the signal from the low pass filter 9 to a threshold circuit 10 the waveform of FIG. 2E may be derived which is a bipolar binary signal switching from one given value to the other given value upon each occurrence at which the low pass signal of FIG. 2D passes through the threshold of the threshold circuit 10 which is illustrated diagrammatically in FIG. 2D as a dashed line. Thus, FIG. 2E illustrates an output signal identifying the binary information coded on the wave of FIG. 2A by phase reversal without any need for the comparison of the wave with a signal derived from a reference output as required in known prior art systems.

Figure 3:
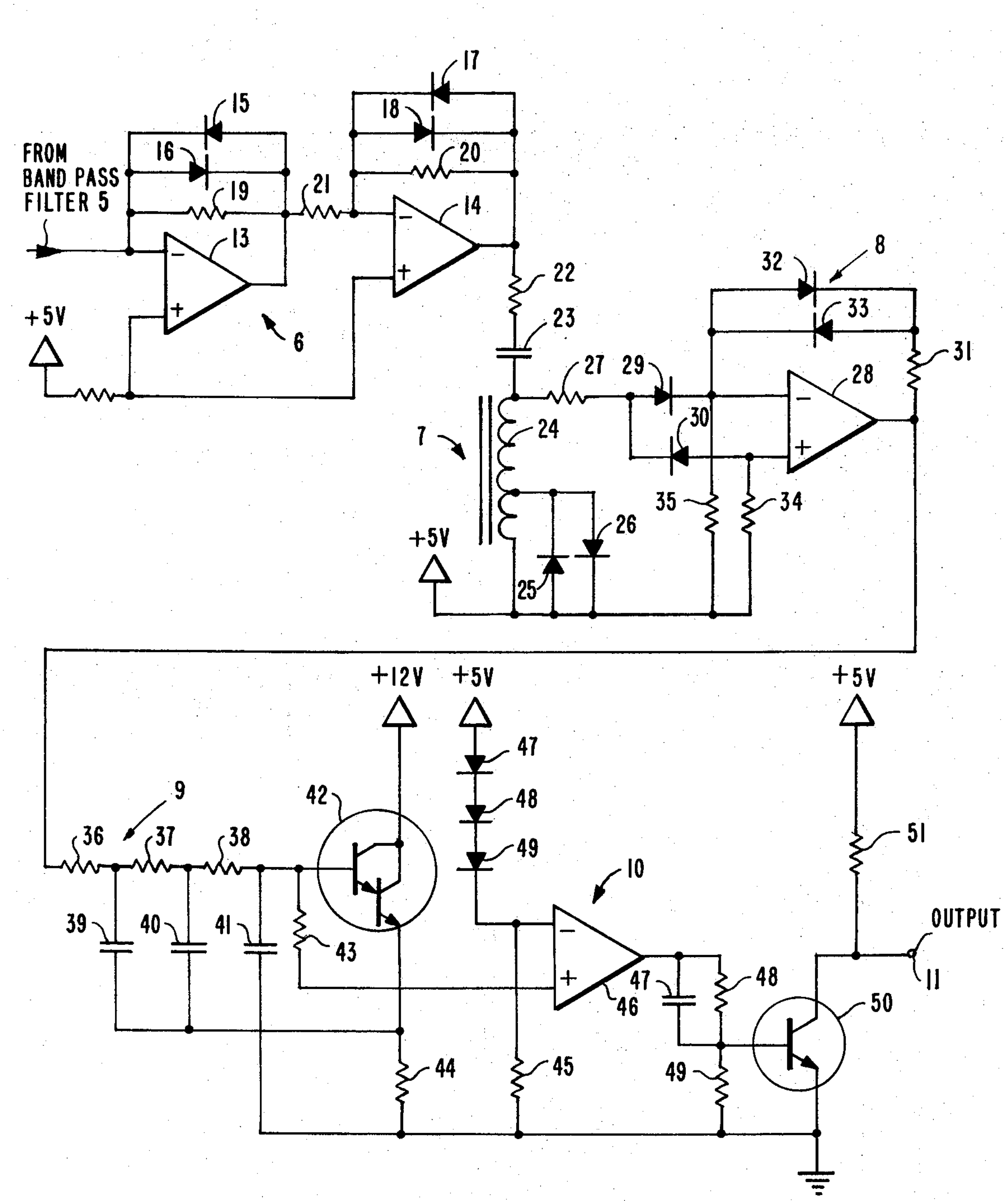

One specific arrangement for performing the functions of the portion of the apparatus shown in FIG. 1 enclosed by the dashed rectangle 12 is shown in FIG. 3 in which like reference characters have been employed to indicate like parts. In FIG. 3 the applied phase reversal modulated alternating wave from the bandpass filter 5 of FIG. 1 is applied to a two stage limiter indicated generally by the numeral 6. Each of the limiters comprises an operational amplifier 13 and 14 in the feedback paths of which are connected back-to-back diodes 15, 16 and 17, 18 respectively. The pairs of back-to-back connected diodes 15, 16 and 17, 18 function to determine thresholds at which the limiters operate to establish a finite and predetermined value of the wave appearing at the output of each of the amplifiers 13 and 14 respectively. By means of negative feedback resistors 19 and 20 the operational amplifiers are gain limited at relatively small signal values at which the diodes are not conductive. In any event, the limiter amplifiers 13 and 14 are connected together by a coupling resistor 21 so as to provide at the output of the amplifier 14 an amplitude limited wave which is substantially constant irrespective of the amplitude of the wave applied to the limiters over a wide range of values. The output wave from the limiter amplifier 14 is applied to the resonator 7 via a coupling resistor 22. The resonator 7 comprises a series resonant circuit including a capacitor 23 and an inductor 24. The values of the capacitor 23 and the inductor 24 are chosen to be resonant at the frequency of the phase reversal modulated wave which in the example given above may be 600 cps. The value of the Q of the circuit may be selected to be of the value of approximately 6 for the example given where the frequency of the wave is 600 cps and the bit rate is 150 bps. Additional limiting of the wave as it appears in the resonator 7 is provided by the pair of back-to-back diodes 25 and 26 connected between a tap on the inductor 24 and a reference potential.

In operation, the series resonant circuit of the capacitor 23 and the inductor 24 stores energy and resonates or oscillates at the frequency of the applied alternating current wave. However, upon a reversal of phase the energy of the applied wave tends to subtract from the energy stored in the series resonant circuit so that over a predetermined number of cycles the energy stored in the series resonant circuit is dissipated and the phase of the wave in the resonator reverses with a gradual buildup to a constant level corresponding to the newly applied phase. Thus, a signal may be taken from across the inductor 24 which has an amplitude variation corresponding to phase reversals of the applied wave. The signal derived from the inductor is then applied to a full wave rectifier circuit 8 via a resistor 27. The full wave rectifier circuit 8 comprises an operational amplifier 28 with a pair of oppositely poled diodes 29 and 30 connected between the resistor 27 and differential connections of the amplifier 28. A feedback loop around the amplifier 28 is provided by a resistor 31 and a pair of oppositely poled diodes 32 and 33 to provide a negative feedback signal which introduces compensating voltages into the input of the amplifier 28 for temperature variations and the like. The amplifier 28 may be returned to reference potential by means of the resistors 34 and 35 respectively. The output of the full wave rectifier 8 including the amplifier 28 is applied in schematic circuit diagram in FIG. 3 to a three-stage low pass filter 9 comprising the resistors 36, 37 and 38, and the capacitors 39, 40 and 41. The output of the low pass filter 9 is applied to a two section Darlington-type transistor amplifier 42 which is coupled to a threshold circuit by means of the resistors 43, 44 and 45. The threshold circuit 10 comprises a high gain amplifier 46 which receives at one terminal a voltage from a regulated source via three series connected diodes 47, 48 and 49. The diodes 47, 48 and 49 establish a threshold for comparision of the wave supplied to the low pass filter 9 via the Darlington transistor amplifier 42 and the resistors 43, 44 and 45.

In operation, the amplifier 46 is chosen to have an extremely high gain so that whenever the output voltage from the low pass filter 9 and amplifier exceed a predetermined level determined by the characteristics of the diodes 47, 48 and 49 the output of the amplifier 46 assumes one given value. On the other hand, whenever the value of the voltage from the low pass filter and the Darlington amplifier 42 drops below a given threshold value the output signal from the amplifier 46 assumes another value. By this means an output signal is supplied by the amplifier 46 which may be coupled to the signal output terminal 12 via a network comprising the capacitor 47, the resistors 48 and 49 and the transistor amplifier 50. Thus, at the output terminal 11 there appears a waveform corresponding to FIG. 2E in the circuit of FIG. 3 as described previously in connection with the block diagram of FIG. 1.

In overall operation it will be understood that the apparatus of the schematic circuit diagram of FIG. 3 of the invention requires various operating voltages in conventional fashion which may be applied to the terminals as indicated and in the values as indicated.

In accordance with the invention described above, there is provided a new and improved apparatus for deriving information from a phase reversal modulated wave without requiring a comparison with a reference wave. Although one particular embodiment of the invention has been shown and described, it will be appreciated that the inventive concepts set forth herein are not necessarily limited to the specific structure shown. Accordingly, the invention should be considered to include any and all variations, modifications or alternative arrangements falling within the scope of the annexed claims.

What is claimed is:

1. A demodulator for deriving an output signal from an alternating current wave modulated by phase reversals including the combination of means for limiting the wave to a predetermined amplitude, a resonator coupled to said amplitude limiting means, rectifying means coupled to said resonator and a threshold circuit coupled to said rectifying means for deriving an output signal identifying the phase reversals of said alternating current wave.

2. A demodulator for deriving an output signal from an alternating current wave having a given frequency which is modulated by 0° – 180° phase reversals which bear binary data in accordance with which the lack of a phase reversal indicates one binary value and a phase reversal indicates another binary value including the combination of an amplitude limiter for receiving the wave and for limiting the amplitude of the wave to a predetermined amplitude, a resonator having a resonant frequency corresponding to said given frequency coupled to said amplitude limiter, said resonator being adapted to provide an output signal which varies in amplitude in accordance with the phase reversals of said alternating current wave, a rectifier coupled to said resonator, a low pass filter coupled to said rectifying means for providing an output signal having a wave shape corresponding to the amplitude varying envelope of the wave appearing at the output of the resonator and a threshold circuit coupled to said low pass filter for providing a binary output signal which changes from one value to another value in accordance with phase reversals of the alternating current wave.

3. A demodulator in accordance with claim 2 in which the resonator comprises a series resonant circuit having a resonant frequency equal to the said given frequency of said alternating current wave and having a Q selected to enable the output signal from the resonator to decrease in amplitude in response to a phase reversal to a minimum value at which the phase of the output signal from the resonator reverses and commences to increase within a preselected period determined by the rate of transmission of binary data.

4. A demodulator for deriving an output signal from an alternating current wave bearing binary coded digital information transmitted at a given bit rate and in which one binary value is represented by a lack of reversal of phase of the wave and another binary value is represented by a reversal phase of the wave including the combination of means for receiving the alternating current wave and for limiting the wave to a predetermined amplitude, a resonator coupled to said amplitude limiting means having a preselected Q which enables the resonator upon a reversal of phase of the alternating current wave to provide an output signal which is amplitude modulated within the time interval between the appearance of successive bits of information within said given bit rate, rectifying means coupled to the resonator, a low pass filter coupled to said rectifying means for providing an output signal corresponding to the envelope of the signal appearing at the output of the resonator, and a threshold circuit coupled to said low pass filter for deriving an output signal identifying the phase reversals of said alternating current wave.

5. In a system in which binary data is transmitted by reversing the phase of an alternating current wave to represent one binary value while transmitting the alternating current wave without phase reversal to represent another binary value and in which binary data is transmitted at a given bit rate the combination of an amplitude limiter to which the alternating current wave is applied and which provides at its output a wave having a substantially predetermined amplitude irrespective of the amplitude of the wave applied to the limiter over a wide range of values, a resonator coupled to the limiter for receiving the amplitude limited wave, said resonator having a resonant frequency corresponding to the alternating current wave and having the capability of responding to a reversal in phase of the alternating current wave with a reduction in the amplitude of the wave appearing at its output corresponding to each phase reversal of the alternating current wave, and a threshold circuit coupled to said resonator for deriving an output signal respresenting phase reversals of the alternating current wave.

6. Apparatus in accordance with claim 5 in which a rectifier is coupled to the output of the resonator and a low pass filter is connected between the output of the rectifier and the threshold circuit.

7. In a binary data transmission system in which an alternating current wave bears binary information in the form of phase reversals representing one binary value and a lack of phase reversals representing another binary value, a demodulator for deriving an output signal from the alternating current wave including the combination of means for applying an amplitude limited wave corresponding to said alternating current wave to the demodulator, a resonator coupled to the amplitude limiting means having a frequency corresponding to the alternating current wave, and means deriving an output signal from the resonator identifying each phase reversal of the alternating current wave.

8. A method for deriving an output signal representing phase reversals from an alternating current wave modulated by a reversal of phase including the steps of limiting the amplitude of the alternating current wave to a predetermined amplitude, comparing the energy of the alternating current wave for a pre-determined period with energy derived from the alternating current wave for a subsequent period, determining whether or not the energy of the alternating current wave during a first period as compared to the energy of the alternating current wave during the subsequent period is additive or subtractive and deriving an output signal identifying whether the alternating current wave is additive or subtractive during the preceding period whereby an output signal is provided identifying phase reversals of said alternating current wave.

* * * * *